(12) United States Patent
Pothier

(10) Patent No.: US 11,794,902 B2
(45) Date of Patent: Oct. 24, 2023

(54) LAVATORY ENCLOSURE RECONFIGURABLE TO ACCOMMODATE A STRETCHER

(71) Applicant: C SERIES AIRCRAFT MANAGING GP INC., Mirabel (CA)

(72) Inventor: Steve Pothier, Plainville (CA)

(73) Assignee: AIRBUS CANADA MANAGING GP INC., Mirabel (CA)

(*) Notice: Subject to any disclaimer, the term of this patent is extended or adjusted under 35 U.S.C. 154(b) by 639 days.

(21) Appl. No.: 16/652,192

(22) PCT Filed: Oct. 15, 2018

(86) PCT No.: PCT/IB2018/057984
§ 371 (c)(1),
(2) Date: Mar. 30, 2020

(87) PCT Pub. No.: WO2019/077476
PCT Pub. Date: Apr. 25, 2019

(65) Prior Publication Data
US 2020/0247544 A1 Aug. 6, 2020

Related U.S. Application Data

(60) Provisional application No. 62/573,476, filed on Oct. 17, 2017.

(51) Int. Cl.
*B64D 11/02* (2006.01)
*A61G 3/08* (2006.01)
*B64D 11/00* (2006.01)

(52) U.S. Cl.
CPC ............ *B64D 11/02* (2013.01); *A61G 3/0816* (2013.01); *B64D 2011/0046* (2013.01); *B64D 2011/0092* (2013.01)

(58) Field of Classification Search
CPC ............ B64D 11/02; B64D 2011/0092; A61G 3/0816
See application file for complete search history.

(56) References Cited

U.S. PATENT DOCUMENTS 4,589,463 A    5/1986    Ryan
6,273,366 B1*  8/2001    Sprenger ................ B64D 11/00
                                                      244/118.6

(Continued)

FOREIGN PATENT DOCUMENTS

EP    2711295 A2    3/2014
EP    3118114 A1    1/2017
EP    2803577 B1    5/2019

OTHER PUBLICATIONS

International Preliminary Report on Patentability dated Apr. 30, 2020, for International Patent Application No. PCT/8B2018/057984.

(Continued)

*Primary Examiner* — Richard Green
(74) *Attorney, Agent, or Firm* — KARCESKI IP LAW, PLLC

(57) ABSTRACT

A lavatory enclosure for an aircraft, reconfigurable to accommodate a stretcher, includes a first wall, a second wall, a third wall, and a fourth wall. The lavatory enclosure has a doorway in the third wall and a door having a first side, a second side, an upper end, and a lower end, in the doorway. The door is operable between an opened position and a closed position. A reconfigurable wall element with a first edge and a second edge is disposed in the second wall. The reconfigurable wall element has a hinge along the first edge permitting the reconfigurable wall element to pivot between a closed position, where the reconfigurable element is flush with the second wall, and an opened position, where the (Continued)

second edge of the reconfigurable wall element is pivoted so that the second edge is interior to the lavatory enclosure.

16 Claims, 6 Drawing Sheets

(56) References Cited

U.S. PATENT DOCUMENTS

| | | | | |
|---|---|---|---|---|
| 8,424,130 | B2* | 4/2013 | Dannenberg | B64D 11/02 |
| | | | | 4/316 |
| 9,308,997 | B2* | 4/2016 | Scown | B64D 11/02 |
| 9,428,259 | B2* | 8/2016 | Savian | B64D 11/02 |
| 9,862,490 | B2* | 1/2018 | Schliwa | B64D 11/02 |
| 2013/0206907 | A1 | 8/2013 | Burrows et al. | |

OTHER PUBLICATIONS

International Search Report dated Jan. 22, 2019, for International Patent Application No. PCT/IB2018/057984.

* cited by examiner ated filing date of Oct. 15, 2018, which relies on and claims
LAVATORY ENCLOSURE RECONFIGURABLE TO ACCOMMODATE A STRETCHER

CROSS-REFERENCE TO RELATED APPLICATION(S)

This is a National Stage Entry into the United States Patent and Trademark Office from International PCT Patent Application No. PCT/IB2018/057984, having an international filing date of Oct. 15, 2018, which relies on and claims priority to U.S. Provisional Patent Application No. 62/573,476, filed on Oct. 17, 2017, entitled, "LAVATORY ENCLOSURE RECONFIGURABLE TO ACCOMMODATE A STRETCHER," the entire contents of both of which are incorporated herein by reference.

FIELD OF THE INVENTION

The present invention concerns a lavatory enclosure, such as may be found on board an aircraft. The lavatory enclosure is reconfigurable to accommodate a stretcher (or similar device), facilitating ingress and egress into and out of the aircraft.

DESCRIPTION OF THE BACKGROUND AND RELATED ART

As should be apparent to those skilled in the art, the interior of an aircraft typically includes a number of compartments including, but not limited to, lavatory enclosures.

As also should be apparent to those skilled in the art, in aircraft, particularly commercial aircraft, the compartments are configured to maximize the use of available space.

During a medical emergency, it may become necessary for emergency medical technicians to move a passenger on a stretcher from the cabin of the aircraft, possibly to a nearby medical facility.

Due to the space constraints on an aircraft, it is possible that a stretcher may not be movable around one or more corners associated with the compartments of the aircraft, particularly the corners associated with a lavatory enclosure.

To facilitate egress of a passenger on a stretcher from the cabin of an aircraft, aircraft designers look to desirable solutions that do not place adverse demands on the interior configuration of the aircraft.

While some solutions have been proposed by the prior art, a need exists for improved solutions.

SUMMARY OF THE INVENTION

The present invention addresses one or more of the deficiencies with respect to the prior art.

In particular, the present invention provides lavatory enclosure for an aircraft, reconfigurable to accommodate a stretcher. The lavatory enclosure includes a first wall, a second wall disposed apart from the first wall by a width, a third wall extending between the first wall and the second wall, and a fourth wall disposed apart from the third wall by a depth and extending between the first wall and the second wall. The lavatory enclosure also includes a doorway defined in the third wall, extending along at least a portion of the width, and a door having a first side, a second side, an upper end and a lower end, the door being disposed in the doorway. The door is operable between an opened position and a closed position. A reconfigurable wall element, having a first edge and a second edge, is disposed in the second wall.

The reconfigurable wall element comprises a hinge disposed along the first edge permitting the reconfigurable wall element to pivot between a closed position, where the reconfigurable element is flush with the second wall, and an opened position, where the second edge of the reconfigurable wall element is pivoted so that the second edge is interior to the lavatory enclosure.

In one contemplated embodiment, the first wall is a bulkhead positioned behind a row of seats.

The second wall is contemplated to be a bulkhead positioned adjacent to a passageway.

This passageway may extend to a door of the aircraft.

The third wall is contemplated to extend along an aisle extending along a longitudinal axis of the aircraft.

The fourth wall is contemplated to be a portion of the fuselage.

The third wall may define a utility group panel adjacent to the doorway, disposed between the doorway and the first wall, the utility group panel being adjacent to a utility group.

The utility group is contemplated to be interior to the lavatory enclosure.

The utility group panel of the third wall may provide access to components of the utility group.

It is also contemplated that the doorway is disposed on the third wall such that the second side of the door defines an intersection between the second wall and the third wall.

In particular, the second edge of the reconfigurable wall element may abut against the second side of the door when the reconfigurable wall element is in the closed position.

The lavatory enclosure may be configured so that the second edge of the reconfigurable wall element abuts against the second side of the door when the reconfigurable wall element is in the closed position.

When the reconfigurable wall element is in the opened position, the reconfigurable wall element establishes an opening in the second wall permitting a stretcher to extend therein.

When the reconfigurable wall element is in the opened position and the door is moved adjacent to the first wall, the opening in the second wall and the doorway permit a stretcher to extend therein.

The utility group may encompass at least one of plumbing and electrical conduits.

The door is contemplated to be a bi-fold door.

The third wall may include a transom panel above the door with a track attached thereto.

Where the transom panel includes a track, the door may include a pivot disposed at the upper end on the first side. The pivot is contemplated to slide in the track, permitting the door to be opened.

Still further, the door is contemplated to include a first, releasable pivot disposed at the upper end on the second side and a second, releasable pivot disposed at the lower end on the second side. The first and second, releasable pivots permit the door to be opened and closed by rotating therearound. The first and second releasable pivots may be disengaged from associated brackets to permit the door to be moved adjacent to the first wall when the reconfigurable wall element is moved to the opened position.

The present invention also provides for an aircraft with a lavatory enclosure as described above.

The present invention also provides for an aircraft with several lavatories on board that are constructed as set forth herein.

Further aspects of the present invention will be made apparent from the paragraphs that follow.

BRIEF DESCRIPTION OF THE DRAWING(S)

The present invention will now be described in connection with the drawings appended hereto, in which.

DETAILED DESCRIPTION OF EMBODIMENT(S) OF THE INVENTION

The present invention will now be described in connection with one or more embodiments thereof. The discussion of the embodiments is not intended to be limiting of the present invention. To the contrary, any discussion of specific embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

Aspects of the present invention are described in connection with one or more configurations for the interior of an aircraft. In particular, the present invention is contemplated to be employed on an aircraft with a single, central aisle. However, the present invention may be employed on any other type of aircraft. Still further, the present invention may be employed on other vehicles where space is a premium. For example, the present invention may be used on a train car, a boat, a ship, a recreational vehicle, or the like.

Figure 1:
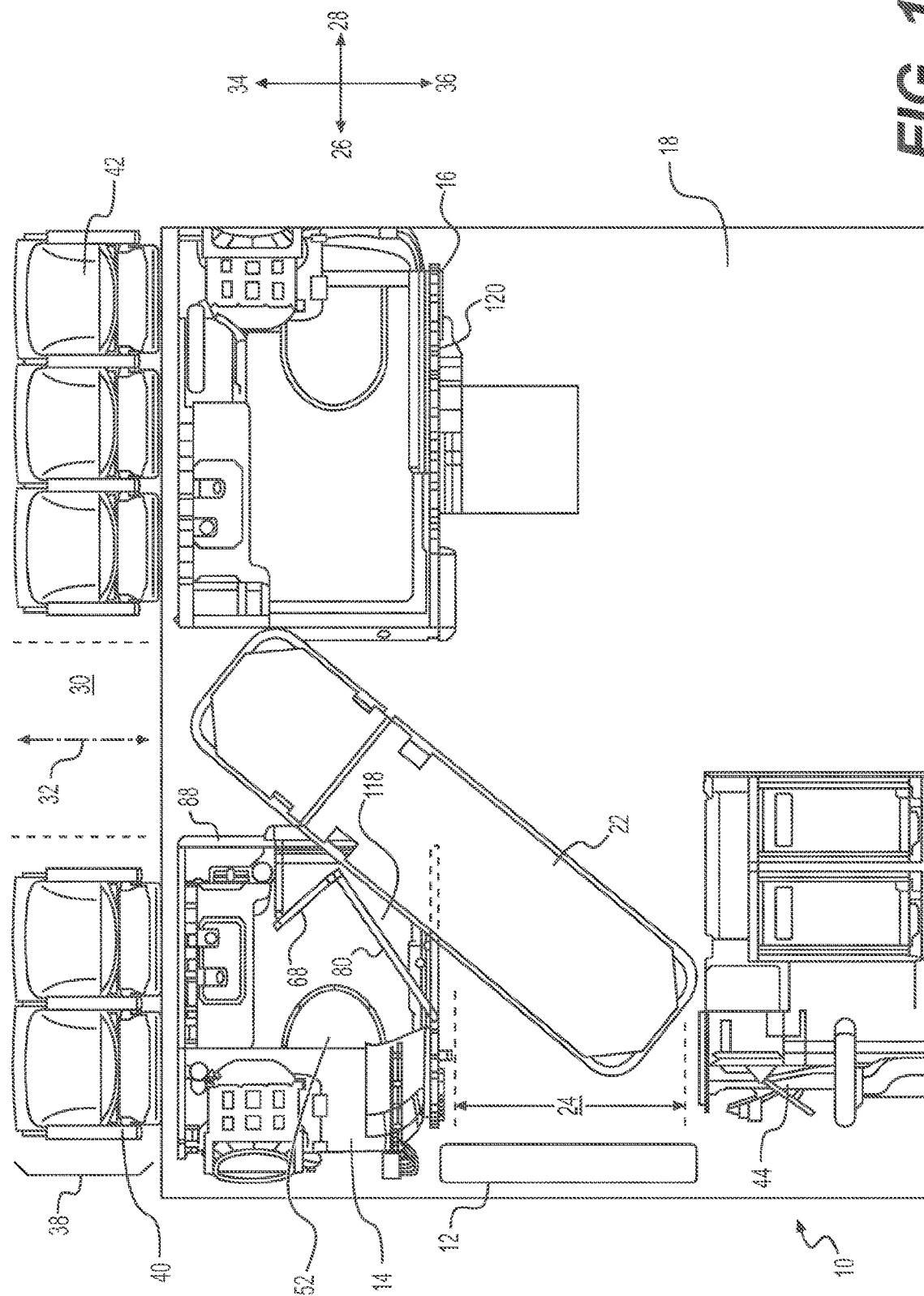
FIG. 1 is a graphical, top view of a contemplated configuration of a lavatory enclosure according to the present invention that may be reconfigured to facilitate passage of a stretcher therethrough.

FIG. 1 is a top view of one contemplated layout for a portion of an interior 10 of an aircraft. Specifically, the portion of the interior 10 shown is adjacent to a door 12 that provides ingress into and egress out of the aircraft.

The interior 10 includes a first lavatory enclosure 14 disposed adjacent to the door 12. The interior 10 also includes a second lavatory enclosure 16 disposed across from the first lavatory enclosure 14 on the opposite side of the fuselage 18. While this is one possible configuration for the interior 10 of the aircraft, the lavatory enclosures 14, 16 may be employed in any other configuration for an aircraft interior 10 as required or as desired.

In an emergency, it may become necessary for emergency medical personnel EMTs to board the aircraft and transport a passenger from the interior 10. However, the layout of the interior 10 of the aircraft may be such that it may not be possible to carry a passenger 20, prone on a stretcher 22, out of the aircraft interior 10. Specifically, one or more bulkheads and/or other obstructions may prevent the stretcher 22 from transitioning around the bulkhead and/or obstruction so that the stretcher 22 may be carried out of the aircraft, through the door 12.

To address this possible problem, the present invention provides a construction for a lavatory enclosure 14 that facilitates transportation of a passenger 20 prone on a stretcher 22 by permitting the lavatory enclosure 14 to be reconfigured to accommodate the stretcher 22 therethrough.

As illustrated in FIG. 1, the lavatory enclosure 14 is positioned inside a door 12 to the aircraft. The lavatory enclosure 14 is adjacent to a passageway 24 that extends across the width of the interior 10 of the aircraft from the port side 26 to the starboard side 28. The lavatory enclosure 14 also extends along an aisle 30 that runs parallel to the longitudinal axis 32 of the aircraft that extends from the bow 34 to the stern 36.

As shown, the lavatory enclosure 14 is positioned rearwardly of a row of seats 38, specifically a pair of seats 40 that are a part of the row of seats 38. The lavatory enclosure 16 is disposed across the aisle 30, also behind the row of seats 38, specifically a grouping of three seats 42 within the row of seats 38.

As should be apparent to those skilled in the art, the illustrated configuration for the interior of an aircraft is intended to be exemplary only. The number of seats positioned adjacent to the lavatory enclosures 14, 16 is not relevant to the present invention. Any number of seats may be provided in the aircraft, in any suitable configuration, without departing from the scope of the present invention.

Across the passageway 24 from the lavatory enclosure 14, it is contemplated that the aircraft interior 10 may include a galley 44 or some other equipment. The galley 44 may extend partially across the width of the interior 10 or completely across the width. The presence of the galley 44 (or other obstruction) is not particularly relevant, except that the galley 44 or other obstruction limits movement of the stretcher 22 through the interior 10.

It is noted that the interior 10 may be oriented such that the bow 34 and the stern 36 are reversed in their orientation. If so, it is contemplated that the seats 40, 42 may be reoriented to face in the direction opposite to that illustrated in FIGS. 1 and 2.

Figure 2:
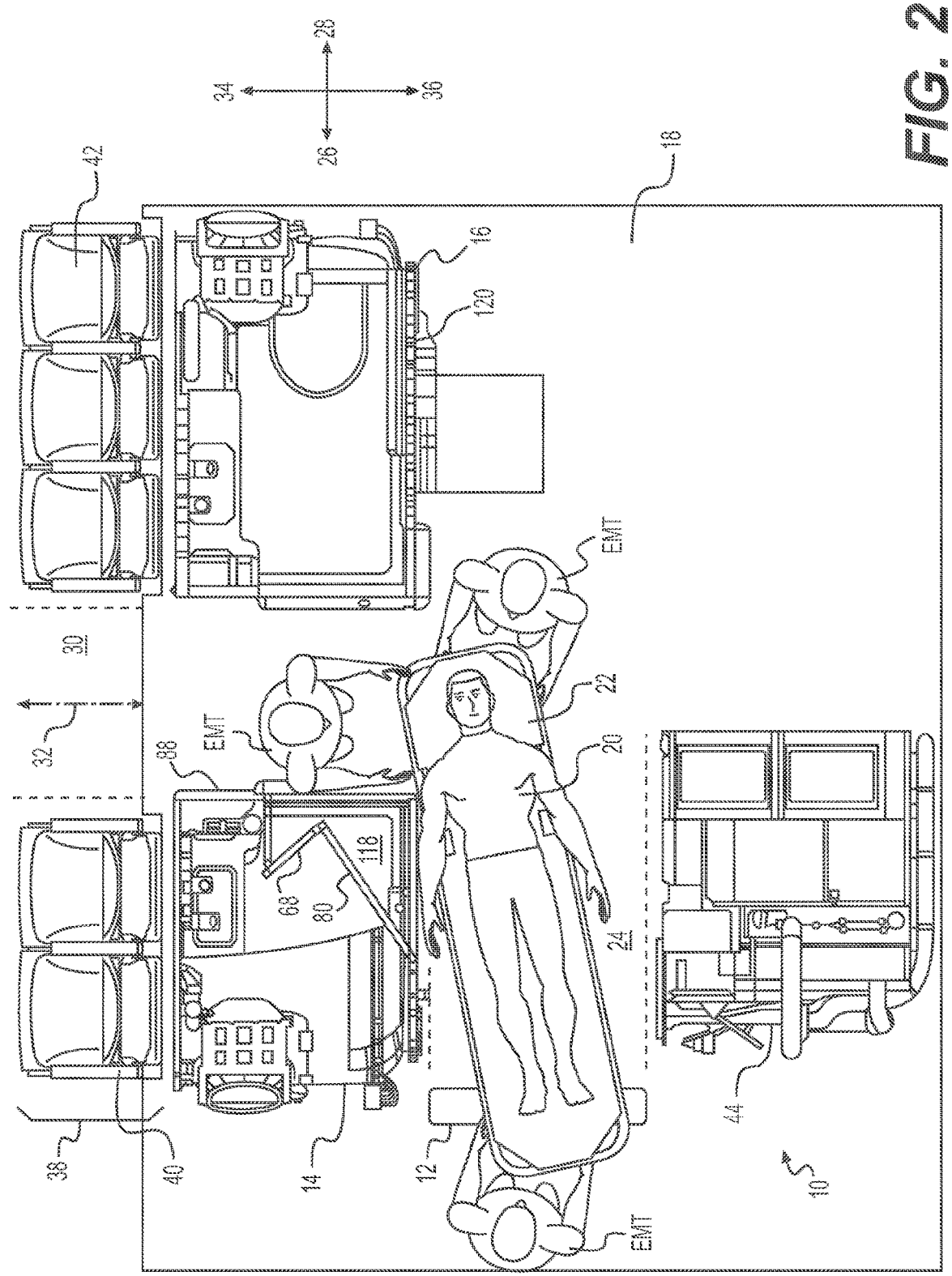
FIG. 2 is a graphical, top view of the lavatory enclosure illustrated in FIG. 1, providing additional detail.

As is apparent from a comparison between FIGS. 1 and 2, the stretcher 22 is illustrated in a different position within the interior 10 of the aircraft. In addition, in FIG. 2, a passenger 20 is illustrated on the stretcher 22. For additional reference, three emergency medical technicians EMTs are shown, carrying the stretcher 22 and the passenger 20, who is prone on the stretcher 22. The stretcher 22 extends into the door 12, which is illustrated in graphical format in FIG. 2.

The specific construction of the lavatory enclosure 14 will now be described in connection with FIG. 3. It is noted that this construction is not intended to be limiting of the present invention. Instead, the discussion that follows is intended to highlight the breadth and scope of the present invention.

The lavatory enclosure 14 includes a first wall 46 that is disposed, on its exterior side, adjacent to the backs of the seats 40. On its interior side, the first wall 46 abuts against a utility group 48 within the lavatory enclosure 14. The first wall 46 is contemplated to be a bulkhead wall, the construction of which should be known to those skilled in the art.

The utility group 48 is contemplated to encompass one or more features that are not reconfigurable by the aircraft crew during normal operation of the aircraft. While not limiting of the present invention, the utility group 48 may include, for example, a sink 50, a toilet 52, a countertop, electrical wiring, mechanical piping, a fire extinguisher cabinet, a waste bin enclosure, a napkin dispenser, an oxygen mask enclosure, or the like. These elements, among others that may be included in the utility group 48 are typically part of the immovable structure of the aircraft.

The lavatory enclosure 14 also includes a second wall 54, which is disposed apart from the first wall 46 to define a width 56 of the lavatory enclosure 14. A third wall 58 extends between the first wall 46 and the second wall 54. The third wall 58 is positioned adjacent to the aisle 30, providing a demarcation between the aisle 30 and the interior of the lavatory enclosure 14. In the drawings, the third wall 58 is depicted as being perpendicular to the first wall 46 and the second wall 54.

A fourth wall 60 also extends between the first wall 46 and the second wall 54. The third wall 58 and the fourth wall 60 define a depth 62 of the lavatory enclosure 14. The fourth wall 60 is contemplated to be parallel to the third wall 58, at least in so far as the footprint of the lavatory enclosure 14 is depicted as being rectangular. As should be apparent to those skilled in the art, the fourth wall 40 is contemplated to be curved to follow the structure of the fuselage 18 of the aircraft.

Like the first wall 46, the second wall 54 and the third wall 58 are contemplated to be bulkhead walls. The fourth wall 60, however, is contemplated to be disposed adjacent to and/or be a part of the fuselage 18. Since the fourth wall 60 abuts against and/or is a part of the fuselage 18, the lavatory enclosure 14 may be provided with a window 64 as shown.

As depicted in the drawings, the lavatory enclosure 14 is contemplated to occupy a rectangular footprint with a width 56 and a depth 62. However, the present invention should not be limited solely to such a construction. It is contemplated that the lavatory enclosure 14 may have a trapezoidal shape, a triangular shape, a parallelogram shape, a polygonal shape, or some other, alternative shape, as required and/or as desired.

The toilet 52 is disposed in the lavatory enclosure adjacent to the fourth wall 60. The toilet is contemplated to extend perpendicularly to the fourth wall 60, as shown. However, the toilet 52 may be disposed at an angle to the fourth wall 60 without departing from the scope of the present invention.

The sink 50 is contemplated to be disposed adjacent to the first wall 46. In the illustrated embodiment, the sink 50 extends parallel to the first wall 46. It is noted, however, that the sink 50 may be angled with respect to the first wall 46 without departing from the scope of the present invention.

The sink 50 is contemplated to be included as a part of the utility group 48. Still further, the toilet 52 also may be considered to be a part of the utility group 48. As noted, the utility group 48 encompasses those elements in the lavatory enclosure 14 that are immovable. As should be apparent to those skilled in the art, the sink 50 and the toilet 52 cannot be moved in the lavatory enclosure 14.

Figure 3:
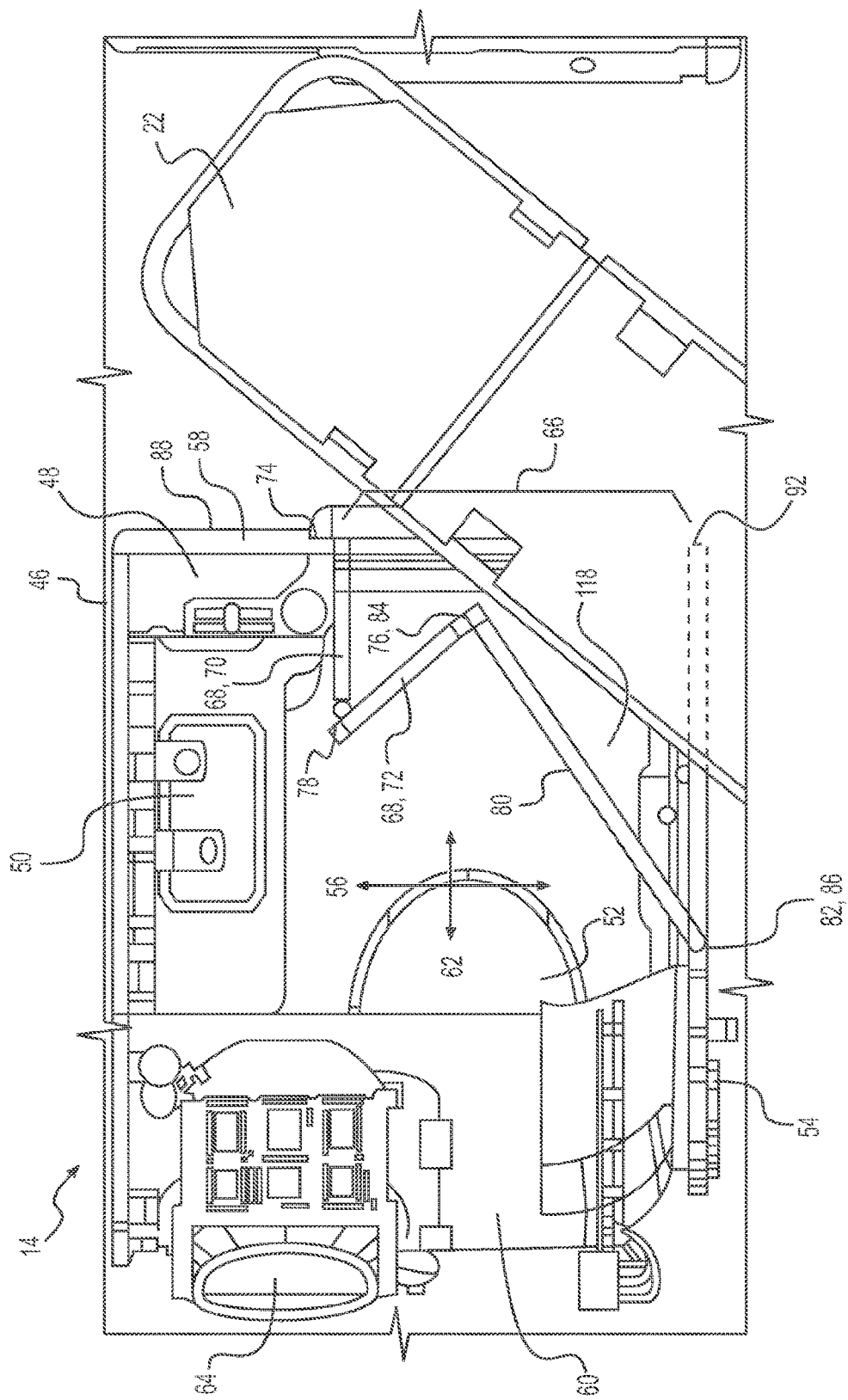
FIG. 3 is an enlarged, graphical, top view of the lavatory enclosure illustrated in FIG. 1.

With continued reference to FIG. 3, the third wall 58 defines a doorway 66 therein. The doorway 66 extends along at least a portion of the width 56 of the lavatory enclosure 14. In other words, the doorway 66 is not contemplated to occupy the entire width 56 of the lavatory enclosure 14. Specifically, for the illustrated embodiment, the doorway 66 occupies less than the width 56 of the lavatory enclosure 14.

A door 68 is disposed in the doorway 66. In the illustrated embodiment, the door 68 is a bi-fold door with a first door panel 70 and a second door panel 72. Alternative constructions for the door 68 are contemplated to fall within the scope of the present invention as well. For example, the door 68 may have an accordion construction (or some other configuration) without departing from the scope of the present invention.

The door 68 is contemplated to define a first side 74 and a second side 76 and to have an upper end 96 and a lower end 100. The first door panel 70 is connected to the second door panel 72 via a hinge 78.

Figure 4:
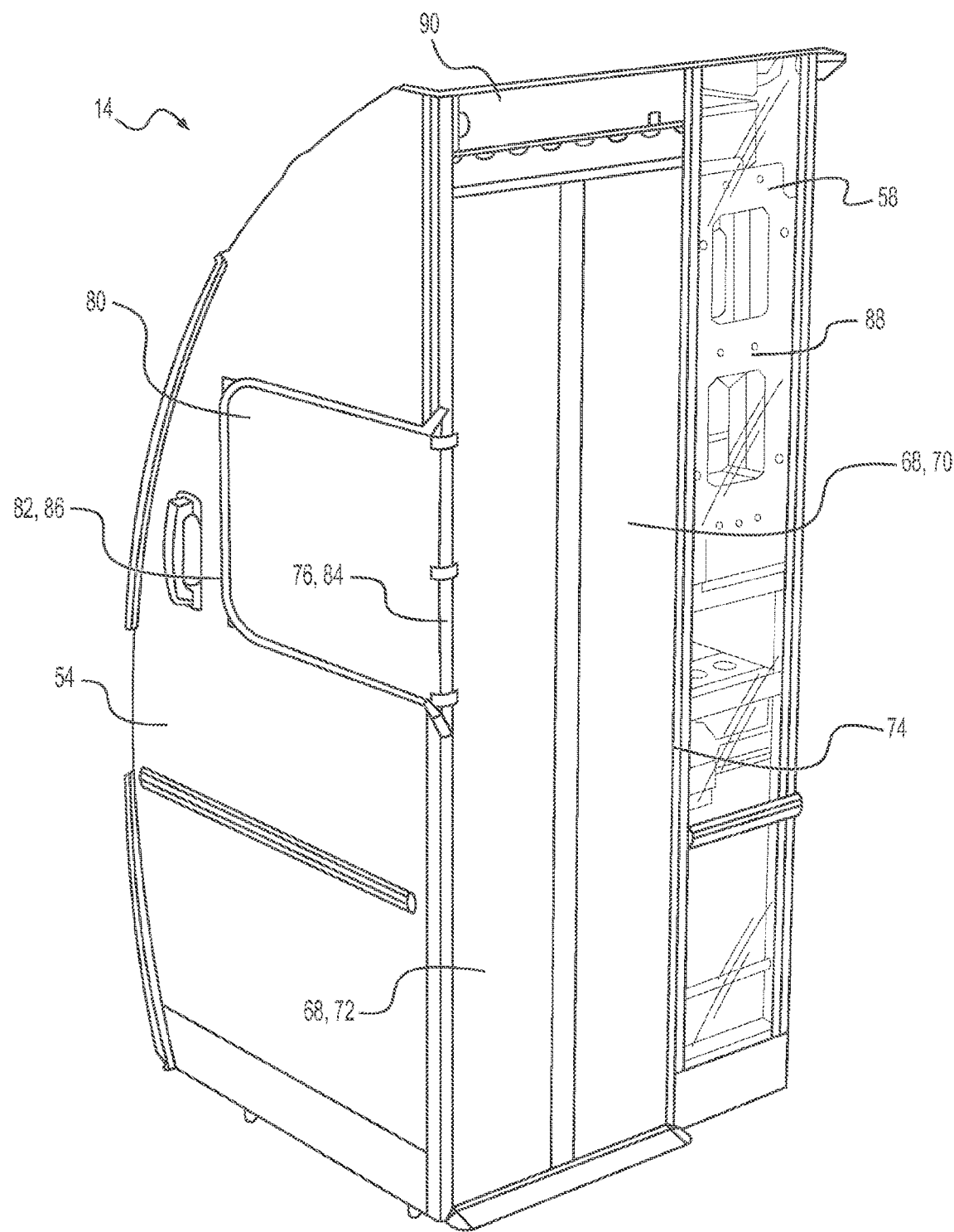
FIG. 4 is a perspective illustration of the lavatory enclosure illustrated in FIG. 1, showing the door and the reconfigurable wall element in the closed positions.
Figure 5:
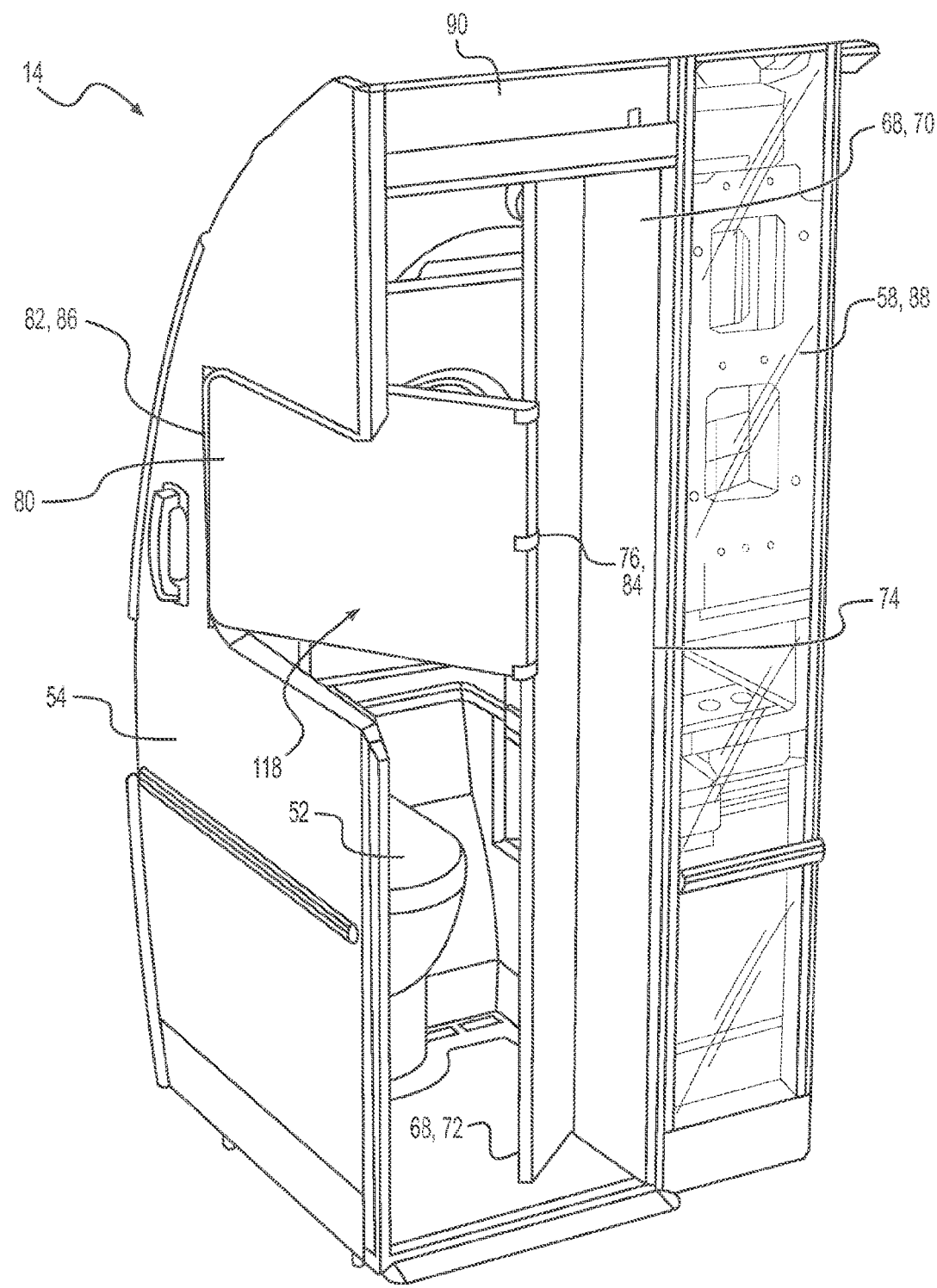
FIG. 5 is a perspective illustration of the lavatory enclosure illustrated in FIG. 1, showing the reconfigurable wall element in the opened position and the door in a position adjacent to a first wall.
Figure 6:
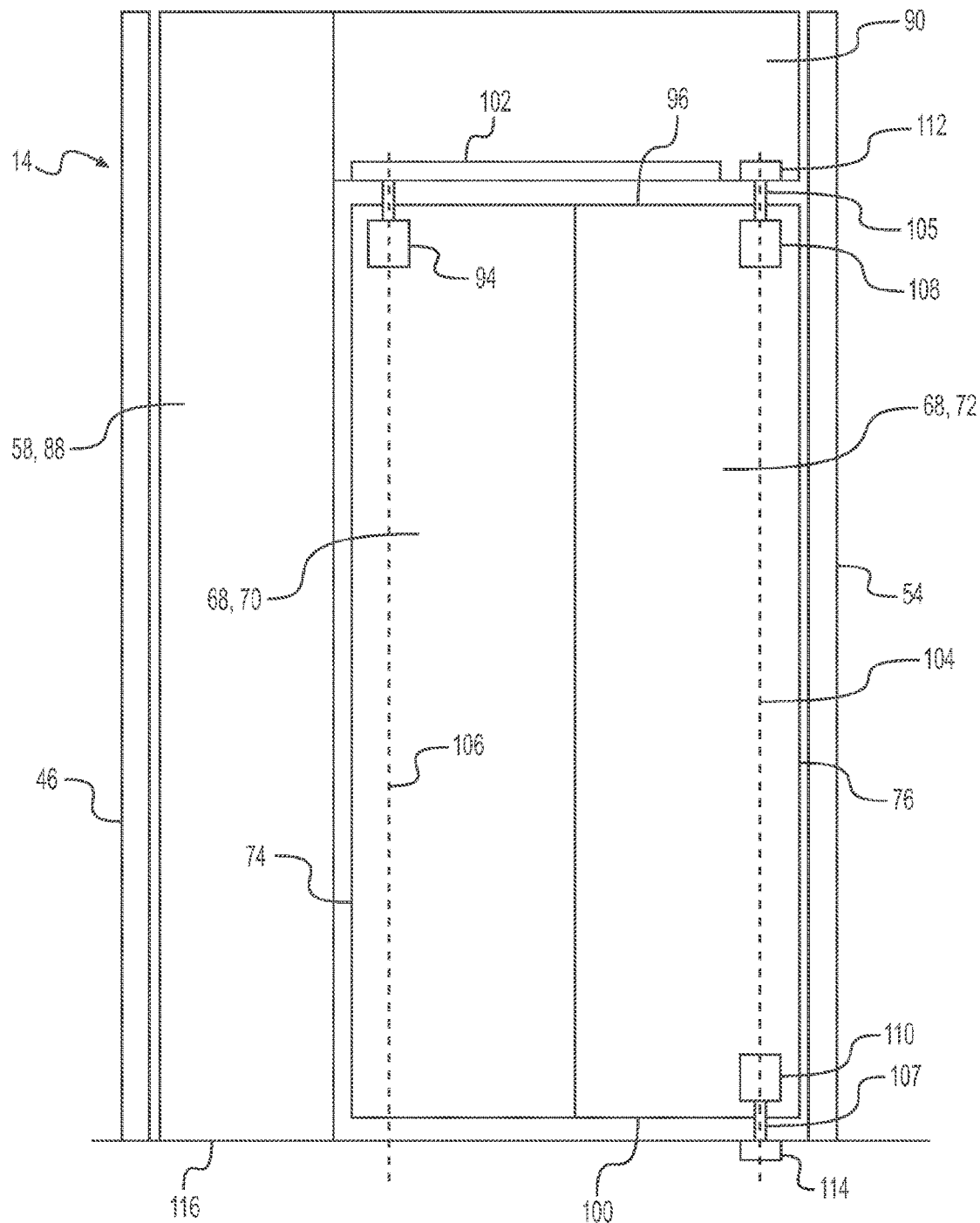
FIG. 6 is a graphical representation of a portion of the door within a wall of the lavatory illustrated in FIGS. 1-5.

The door 68 may be oriented in a closed position to afford privacy to an occupant of the lavatory enclosure 14. The door 68 also may be oriented in an opened position to permit ingress into and egress out of the lavatory enclosure 14. In FIGS. 4 and 6, the door 68 is illustrated in the closed position. In FIGS. 1, 2, 3 and 5, the door 68 is illustrated in the position that makes available the opening 118 to accommodate a stretcher 22. As such, the door 68 is positioned so that at least the first panel 70 is adjacent to the first wall 46. This is also referred to as an "opened" condition of the door 68. However, as should be apparent, when the door 68 is pushed adjacent to the first wall 46, the door 68 has been opened for purposes of reconfiguring the lavatory enclosure 14 to accommodate the stretcher 22.

The lavatory enclosure 14 also includes a reconfigurable wall element 80 disposed in the second wall 54. As illustrated in FIGS. 1 and 2, the door 68 cooperates with the reconfigurable wall element 80 to accommodate the passage of a stretcher 22 through the opening 118 created in the lavatory enclosure 14 when both the door 68 and the reconfigurable wall element 80 are moved to the opened position during a medical emergency.

When the lavatory enclosure 14 is configured for passenger use and, therefore, not configured to accommodate a stretcher 118 during a medical emergency, the door opens toward the second wall 54. When opened during non-emergency use, the door is disposed adjacent to the second wall 54. As such, in its normal, non-emergency use, the door 68 opens in a direction opposite to the opened configuration illustrated in FIGS. 1, 2, 3, and 5. Additional details regarding the operation and construction of the door 68 are provided in connection with the discussion of FIG. 6, below.

The reconfigurable wall element 80 has a first edge 82 and a second edge 84. A hinge 86 is provided on the first edge 82 of the reconfigurable wall element 80. The hinge 86 permits the reconfigurable wall element 80 to pivot between a closed position and an opened position. In the closed position, the reconfigurable element 80 is flush with the second wall 54. In the opened position, the reconfigurable wall element 80 is pivoted so that the second edge 84 is interior to the lavatory enclosure 14.

As noted above, the doorway 66 extends along only a portion of the third wall 58. Configured in this manner, as shown in FIGS. 4 and 5, the third wall 58 has two portions. A utility group panel 88 extends from the first wall 46 to the door 68. The utility group panel 88 covers an end of the utility group 48 that is positioned within the lavatory enclosure 14. It is contemplated that the utility group panel 88 may be configured to provide access to the components of the utility group 48, as required or as desired.

The third wall 58 also includes a transom panel 90 that extends above the doorway 66, above the upper end 96 of the door 68. While the transom panel 90 is provided for the illustrated embodiment, the present invention does not require the transom panel 90. It is contemplated, for example, that the transom panel 90 may not be required in configurations where there is sufficient room in the lavatory enclosure 14 for the door 68 to open and close.

As illustrated in the figures, the doorway 66 is located in the third wall 58 such that the second end 76 of the door 68 defines an intersection 92 between the second wall 54 and the third wall 58 when the door 68 is closed. With this configuration, the second end 76 of the door 68 abuts against the second edge 84 of the reconfigurable wall element 80 when the door 68 is closed.

As illustrated, when the reconfigurable wall element 80 is in the opened position, the second edge 84 is disposed within the interior of the lavatory enclosure 14. And, if the door 68 also is in the opened position for a medical emergency, a stretcher 22 with a passenger 20 may extend in and pass through an opening 118 created in the lavatory enclosure 14.

FIG. 6 is a graphical, elevational view of the door 68 as it might appear from the interior of the lavatory enclosure 14. In the non-limiting embodiment shown in FIG. 6, the door 68 includes a pivot 94 disposed at the upper end 96 on the first side 74. The pivot 94 is contemplated to engage a track 102 that is disposed in or on the transom panel 90. The track 102 is illustrated graphically in FIG. 6. As should be apparent, the pivot 94 establishes a pivot axis 106 around which the first door panel 70 rotates. A portion of the pivot 94, such as a pin, is contemplated to slide in the track 112 as the door 68 folds against the second wall 54, when the door 68 is opened during normal lavatory use.

In one contemplated variation, another track may be provided in the floor 116 of the aircraft and another pivot may be provided at the bottom of the door 68 to compliment the pivot 94. However, this is not a typical arrangement for an aircraft lavatory, as should be apparent to those skilled in the art.

With continued reference to FIG. 6, the door 68 includes a first, releasable pivot 108 at the upper end 96 and a second, releasable pivot 110 at the lower end 100. These releasable pivots 108, 110 are disposed adjacent to the second side 76 of the door 68. The releasable pivots 108, 110 engage brackets 112, 114 in/on the transom panel 90 and the floor 116. The releasable pivots 108, 110 establish a second axis 104 around which the second door panel 72 rotates.

As should be apparent from the drawings, when the door 68 is operated in a non-emergency situation, the door 68 opens around the axis 104 to be disposed adjacent to the second wall 54. In the non-emergency situation, the releasable wall element 80 remains closed so that the second wall 54 establishes an uninterrupted barrier for privacy.

However, when the door 68 is operated in an emergency situation, the releasable pivots 108, 110 present an obstacle to moving the door 68 away from the reconfigurable wall element 80. For this reason, the releasable pivots 108, 110 are contemplated to be manually dis-engageable from the brackets 112, 114.

In an emergency situation, after the releasable pivots 108, 110 are disengaged from the brackets 112, 114, the door 68 may be folded to a position adjacent to the first wall 46 of the lavatory enclosure 14. With the door 68 being opened in this position and the releasable wall element 80 also in the opened position, it is possible to pass the stretcher 22 through the opening 118 created by the opened reconfigurable wall element 80 and the opened door 68.

It is contemplated that the releasable pivots 108, 110 may be spring-actuated. As such, it is contemplated that the releasable pivots 108, 110 will easily re-engage the brackets 112, 114 when the door 68 is returned to a non-emergency mode of operation. For example, the brackets 112, 114 might include ramps (not shown) that engage pins 105, 107 in the releasable pivots 108, 110 so that the pins 105, 107 may be pushed easily back into the brackets 112, 114.

As should be apparent from the foregoing, there are several advantages that the lavatory enclosure 14 offers. These advantages are not intended to limit the present invention, but are intended to highlight desirable aspects of the present invention.

First, by positioning the reconfigurable wall element 80 in the second wall 54, the reconfigurable wall element 80 is positioned on the side of the lavatory enclosure 14 opposite to the location of the utility group 48. With this configuration, the reconfigurable wall element 80 is positioned away from any immovable elements that are included in the utility group 48. As a result, the reconfigurable wall element 80 is positioned within a wall that benefits from an absence of immovable components. Accordingly, the size of the reconfigurable wall element 80 may be made as large as required or desired without adversely impacting the design and construction of the lavatory enclosure 14.

Second, by positioning the door 68 so that the second side 76 is adjacent to the second edge 84 of the reconfigurable wall element 80, it is possible to construct the lavatory enclosure 14 where only two elements need to be moved in order to create the opening 118 to accommodate a stretcher 22. Specifically, with this construction, all that is required is that the door 68 be opened and the reconfigurable wall element 80 to be moved to the opened position. After the door 68 and the reconfigurable wall element are opened, the opening 118 is made available to accommodate the stretcher 22.

Third, by providing the releasable pivots 108, 110 on the door 68, it is possible to quickly disengage the door 68 from the associated brackets 112, 114. As such, it is possible to make the opening 118 available quickly for use during an emergency.

In the foregoing discussion, attention has been focused on the lavatory enclosure 14. However, the same principles of construction may be applied to the lavatory enclosure 16. If so, it is contemplated that a reconfigurable wall element 80 would be provided in the second wall 120 of the second lavatory enclosure 16.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. A lavatory enclosure, reconfigurable between a non-emergency configuration and an emergency configuration, the lavatory enclosure comprising:
   a first wall;
   a second wall disposed apart from the first wall by a width;
   a third wall extending between the first wall and the second wall;
   a fourth wall disposed apart from the third wall by a depth and extending between the first wall and the second wall;
   a doorway defined in the third wall, extending along at least a portion of the width;
   a door having a first side, a second side, an upper end, and a lower end, the door being disposed in the doorway, wherein
      the first side of the door is adjacent to the first wall when the door is closed,
      the second side of the door is adjacent to the second wall when the door is closed,
      in the non-emergency configuration, the door pivots around a first axis disposed on the second side of the door, adjacent to the second wall, and, in the emergency configuration, the door pivots around a second axis disposed on the first side of the door;

a reconfigurable wall element having a first edge and a second edge, the reconfigurable wall element being disposed in the second wall; and a hinge disposed along the first edge of the reconfigurable wall element, wherein, in the non-emergency configuration, the reconfigurable element is flush with the second wall, and, in the emergency configuration, the second edge of the reconfigurable wall element is pivoted so that the second edge is interior to the lavatory enclosure, wherein, in the non-emergency configuration, the second edge of the reconfigurable wall element abuts against the second side of the door, wherein, in the emergency configuration, the reconfigurable wall element establishes an opening in the second wall, and wherein, in the emergency configuration, the opening in the second wall accommodates a stretcher.

2. The lavatory enclosure of claim 1, wherein the door is a bi-fold door.

3. The lavatory enclosure of claim 1, wherein the third wall comprises a transom panel above the door with a track attached thereto.

4. The lavatory enclosure of claim 3, wherein the door further comprises:

a pivot disposed at the upper end on the first side, wherein the pivot slides in the track, permitting the door to be opened, and wherein the pivot establishes the second axis in the emergency configuration.

5. The lavatory enclosure of claim 1, wherein the door further comprises:

a first, releasable pivot disposed at the upper end on the second side; and a second, releasable pivot disposed at the lower end on the second side, wherein the first and second, releasable pivots permit the door to be opened and closed by rotating around the first axis in the non-emergency configuration, and wherein the first and second releasable pivots may be disengaged from associated brackets to permit the door to be moved adjacent to the first wall when the reconfigurable wall element is moved to the opened position in the emergency configuration.

6. An aircraft, comprising:

a fuselage; and the lavatory enclosure of claim 1 disposed within the fuselage.

7. The aircraft of claim 6, wherein the first wall is a bulkhead positioned behind a row of seats.

8. The aircraft of claim 6, wherein the second wall is a bulkhead positioned adjacent to a passageway.

9. The aircraft of claim 8, wherein the passageway extends to the door of the aircraft.

10. The aircraft of claim 6, wherein the third wall extends along the aisle extending along the longitudinal axis of the aircraft.

11. The aircraft of claim 6, wherein the fourth wall extends along the fuselage.

12. The aircraft of claim 6, wherein the third wall defines a utility group panel adjacent to the doorway, disposed between the doorway and the first wall, the utility group panel being adjacent to a utility group.

13. The aircraft of claim 12, wherein the utility group is interior to the lavatory enclosure.

14. The aircraft of claim 12, wherein the utility group panel of the third wall provides access to components of the utility group.

15. The aircraft of claim 12, wherein the utility group comprises at least one of plumbing and electrical conduits.

16. An aircraft, comprising:

a fuselage; and a plurality of the lavatory enclosures of claim 1 disposed within the fuselage.

* * * * *